United States Patent
Longenecker et al.

(10) Patent No.: US 10,149,552 B2
(45) Date of Patent: *Dec. 11, 2018

(54) PINCH FREE FOLDING LOCK

(71) Applicant: ARTSANA USA, INC., Lancaster, PA (US)

(72) Inventors: Michael L. Longenecker, Lancaster, PA (US); James M. Dillner, Leola, PA (US)

(*) Notice: Subject to any disclaimer, the term of this patent is extended or adjusted under 35 U.S.C. 154(b) by 36 days.

This patent is subject to a terminal disclaimer.

(21) Appl. No.: 15/446,718

(22) Filed: Mar. 1, 2017

(65) Prior Publication Data

US 2017/0172311 A1 Jun. 22, 2017

Related U.S. Application Data

(63) Continuation-in-part of application No. 14/590,770, filed on Jan. 6, 2015, now Pat. No. 9,622,593.

(51) Int. Cl.
*A47D 13/06* (2006.01)
*F16B 7/00* (2006.01)

(52) U.S. Cl.
CPC .............. *A47D 13/061* (2013.01); *F16B 7/00* (2013.01); *Y10T 403/32008* (2015.01)

(58) Field of Classification Search
CPC ..... Y10T 403/32008; Y10T 403/32401; Y10T 403/32409; Y10T 403/32426; Y10T 403/32442; Y10T 403/32451; Y10T 403/32459; Y10T 16/54024; Y10T 16/540247; Y10T 16/54025; Y10T 16/5407; A47D 7/00; A47D 13/06; A47D 13/063; A47D 13/061; E04H 15/34; E04H 15/44; E04H 15/48; E04H 15/405; F16B 7/00

USPC .......... 403/52–54, 86, 87, 102, 320; 5/93.1, 5/99.1, 655; 256/25

See application file for complete search history.

(56) References Cited

U.S. PATENT DOCUMENTS

| | | |
|---|---|---|
| 4,069,524 A | 1/1978 | Carlo |
| 4,357,735 A | 11/1982 | Saint et al. |
| 4,934,025 A | 6/1990 | Mariol |
| 5,251,359 A | 10/1993 | Finkl |
| 5,611,634 A | 3/1997 | Wang |
| 5,615,427 A | 4/1997 | Huang |
| 5,857,229 A | 1/1999 | Magnani, Jr. |
| 6,202,229 B1 | 3/2001 | Cheng |

(Continued)

*Primary Examiner* — Amber R Anderson
*Assistant Examiner* — Nahid Amiri
(74) *Attorney, Agent, or Firm* — Patent Law Associates

(57) ABSTRACT

A folding lock assembly for use in a frame for a portable child enclosure that includes a body housing first and second hinges for connecting a pair of equal-length side frame members. The respective hinges are limited in the degree of pivotal movement permitted each between a locked position in which the frame members are linearly aligned and a folded position in which the frame members are substantially parallel. The first hinge permits angular rotation less than 90 degrees while the second hinge permits angular rotation greater than 90 degrees. The differences in the range of hinge rotation offset the distal ends of the frame when the connected members are folded to eliminate a pinch point between frame end members. A latching mechanism is provided to maintain the hinges in a locked configuration wherein one hinge is locked by the position of the second hinge. Releasing the second hinge allows the first hinge to pivot as well.

8 Claims, 10 Drawing Sheets

(56) References Cited

U.S. PATENT DOCUMENTS

| | | |
|---|---|---|
| 6,364,563 B1 | 4/2002 | Cheng |
| 6,510,568 B1 | 1/2003 | Drobinski |
| 6,711,783 B2 | 3/2004 | LeMole |
| 6,729,791 B1 | 5/2004 | Chen |
| 6,954,949 B1 | 10/2005 | Chen |
| 7,108,443 B2 | 9/2006 | Chen |
| 7,284,288 B2 | 10/2007 | Cheng |
| 7,293,304 B2 | 11/2007 | Chen |
| 7,380,311 B2 | 6/2008 | Chen |
| 7,552,487 B2 | 6/2009 | Chen |
| 7,591,031 B2 | 9/2009 | Yang |
| 7,937,786 B2 | 5/2011 | Bergkvist |
| 7,958,601 B2 | 6/2011 | Yu et al. |
| 8,069,533 B2 | 12/2011 | Yu et al. |
| 8,387,178 B2 | 3/2013 | Rivera et al. |
| 8,505,136 B2 | 8/2013 | Yu |
| 8,955,175 B2 | 2/2015 | Wiegmann |
| 2003/0061657 A1 | 4/2003 | Longenecker |
| 2003/0061658 A1 | 4/2003 | Longenecker |
| 2004/0127825 A1 | 7/2004 | Castillo |
| 2006/0021136 A1 | 2/2006 | Cheng |
| 2006/0021138 A1 | 2/2006 | Waldman |
| 2006/0225208 A1 | 10/2006 | Chen |
| 2007/0163041 A1 | 7/2007 | Cheng et al. |
| 2011/0217111 A1 | 9/2011 | Wu |
| 2011/0229251 A1 | 9/2011 | Yeh |
| 2012/0139317 A1 | 6/2012 | Fahl |
| 2013/0074257 A1 | 3/2013 | Mendes et al. |
| 2013/0160205 A1 | 6/2013 | Dowd et al. |
| 2013/0239382 A1 | 9/2013 | Cheng |

…

PINCH FREE FOLDING LOCK

CROSS REFERENCE TO RELATED APPLICATIONS

This application is a continuation in part U.S. application Ser. No. 14/590,770, filed Jan. 6, 2015.

BACKGROUND OF THE INVENTION

The present application relates generally to the field of collapsible enclosures for infants and toddlers and, more particularly, to a folding lock mechanism for a collapsible frame that eliminates pinch points on the frame.

Cribs, play yards, and other portable enclosures are useful to contain and provide a safe environment for small children to sleep or play. Such enclosures generally include side walls and a bottom floor made of fabric material or similar soft goods supported on a collapsible frame that allows the enclosure to be easily reconfigured for use for storage or transport. The drive to minimize the space necessary to contain a collapsed frame has resulted in a relatively congested array of frame members when the frames are collapsed. With this increased congestion comes the potential to create pinch points within the framework, especially as normally spaced-apart frame members are moved into adjacent contact with one another. Continuing refinements in folding frames reinforce the need for folding frame designs to consider potential pinch points and to seek to minimize, if not eliminate any such hazards to the user.

SUMMARY OF THE INVENTION

Accordingly, the present invention, in any of the embodiments described herein, may provide one or more of the following advantages:

According to one embodiment of the present invention, a folding frame includes a folding lock mechanism that retains a pair of connected members in a locked arrangement for use of the frame and a folded arrangement which allows the connected members to be angled in relation to one another so that the frame may be collapsed. Two such folding lock mechanisms are preferable included so that a two-dimensional frame may be formed wherein the folding lock mechanisms are symmetrically disposed therein. Each folding lock includes a body, and first and second hinges, one of the frame members being connected to each hinge. The hinges are limited in the degree of pivotal movement permitted between the locked position and the folded position, the first hinge permitting angular rotation less than 90 degrees and the second hinge permitting angular rotation greater than 90 degrees. The differences in the range of hinge rotation offset the distal ends of the frame when folding equal-length side rail portions to a position in which they are generally parallel.

The folding lock hinges are capable of being locked into a position, generally corresponding to the frame in its fully expanded configuration such as it would be for use, so that movement of the connected frame members is inhibited. A convenient release mechanism allows the hinges to pivot and the frame members to be moved into a more compact configuration for storage of the frame. The release mechanism is configured to act upon one of the hinges; the second hinge is released when the first hinge is moved from its locked position. The release mechanism is preferably configured to enable automatic locking the hinges when the frame members are moved into the fully expanded alignment (e.g., unfolding the crib frame) without additional action by a user.

The folding locks are also configured to minimize the creation of pinch points as the foldable frame is folded and unfolded. The first and second hinges are each shaped to minimize gaps between the pivoting elements and the fixed body as the hinge is moved.

The folding locks are configured to be of simple design, easy to use, and cost effective to manufacture.

These and other objects are achieved in accordance with the present invention by a folding lock assembly for use in a frame for a portable child enclosure that includes a body housing first and second hinges for connecting a pair of equal-length side frame members. The respective hinges are limited in the degree of pivotal movement permitted each between a locked position in which the frame members are linearly aligned and a folded position in which the frame members are substantially parallel. The first hinge permits angular rotation less than 90 degrees while the second hinge permits angular rotation greater than 90 degrees. The differences in the range of hinge rotation offset the distal ends of the frame when the connected members are folded to eliminate a pinch point between frame end members while allowing equal-length side rail members to be used. A latching mechanism is provided to maintain the hinges in a locked configuration wherein one hinge is locked by the position of the second hinge. Releasing the second hinge allows the first hinge to pivot as well.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience, and are determined as a child play yard would normally rest when deployed for use on a floor or a similarly level surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
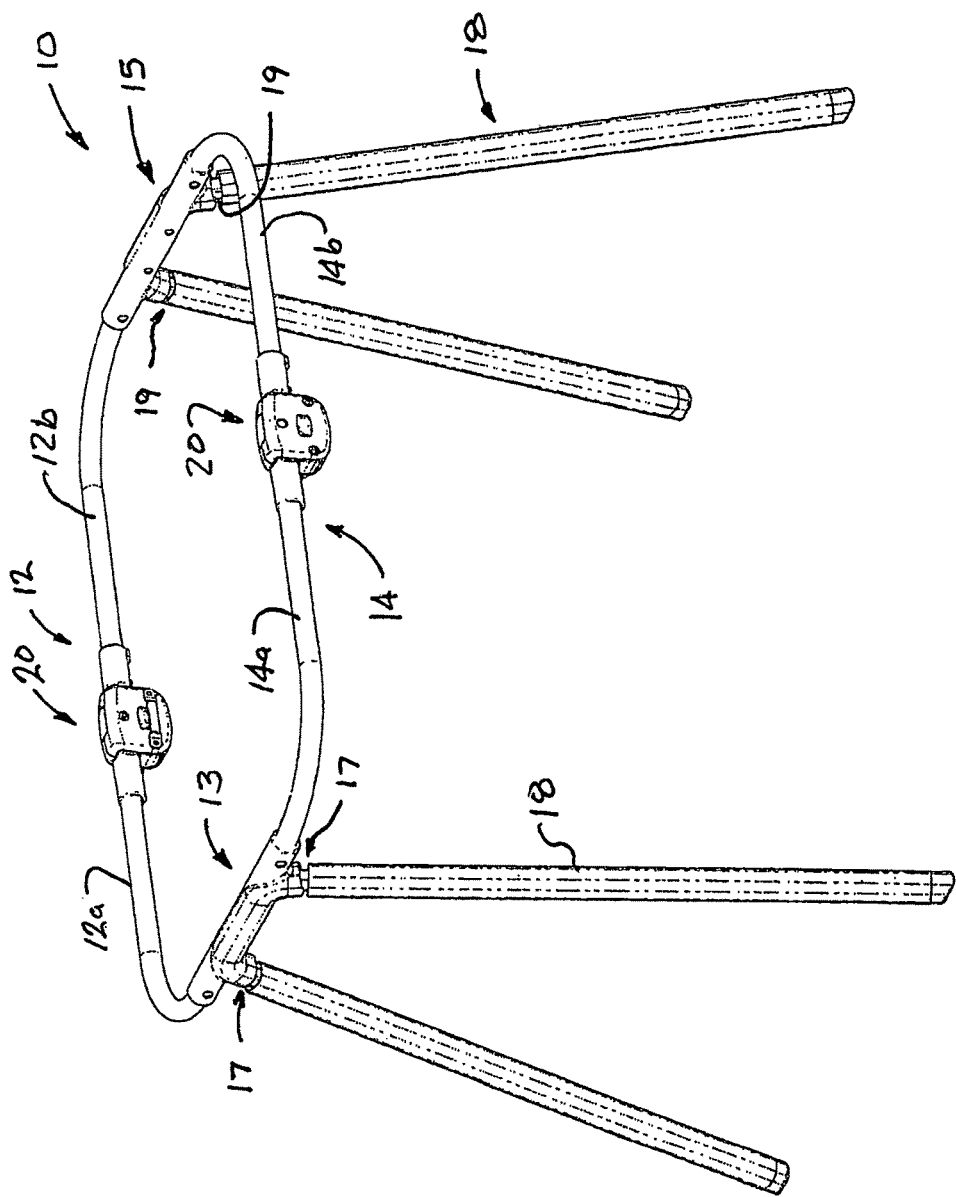
FIG. 1 is a perspective view of a folding frame commonly used with a portable child enclosure of the type on which the present invention is useful.
Figure 2:
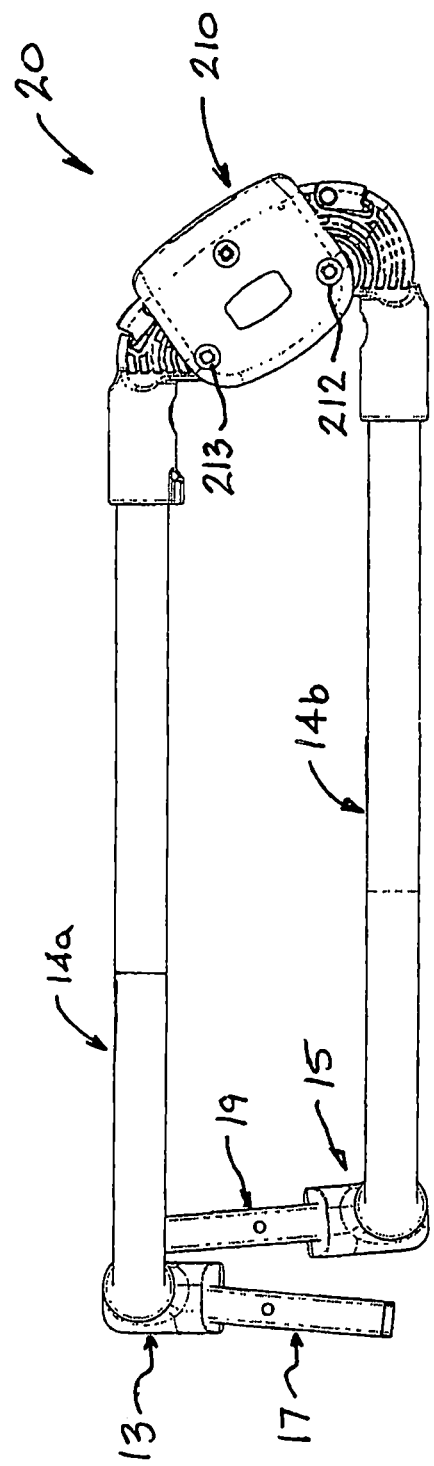
FIG. 2 is a second view of the folding frame of FIG. 1 shown in a folded position illustrating an advantage of the present invention.

FIGS. 1 and 2 illustrate a typical foldable frame 10 that is commonly referred to as a child's play yard. The foldable frame 10 comprises a pair of spaced-apart and generally parallel side frame members 12, 14 and a pair of spaced-apart and generally parallel end frame members 13, 15. The side and end frame members are connected to form frame 10. In the frame illustrated, the side and end frame members are generally perpendicularly arranged to form a rectangular frame 10 when in the unfolded configuration as shown. Legs 18, are shown connected to the end frame members 13, 15 to support the frame 10 at a convenient height above a surface.

The side frame members each include a folding lock mechanism 20 which divides the respective side frame members into a first portion 12a, 14a and a second portion 12b, 14b. The folding lock mechanisms 20 are typically positioned midway along the length of the side frame members 12, 14 to minimize the folded length of the frame 10. It is to be understood that a folding bassinet frame illustrated is used as an exemplary. The offset folding lock with pinch-free provision of the present invention can be used on a wide array of folding frames for which additional compactness of the folded frame is desired.

Some prior art frames require that the first and second portions be of different lengths in order to accommodate structures projecting from the end frame members. Referring specifically to FIG. 2, it can be seen that leg attachments 17, 19 extend from the end frame members away from the plane of the frame 10. When a fully symmetric frame is folded, these leg attachments can impact and limit the compactness of the folded frame. It is common to provide side frame portions of different lengths to offset the leg attachments to prevent contact between the opposing end attachments. The present invention alleviates the need to provide different length frame portions and instead provides a means to offset the end frame members using equal-length side frame portions and an offset lock assembly.

Figure 3:
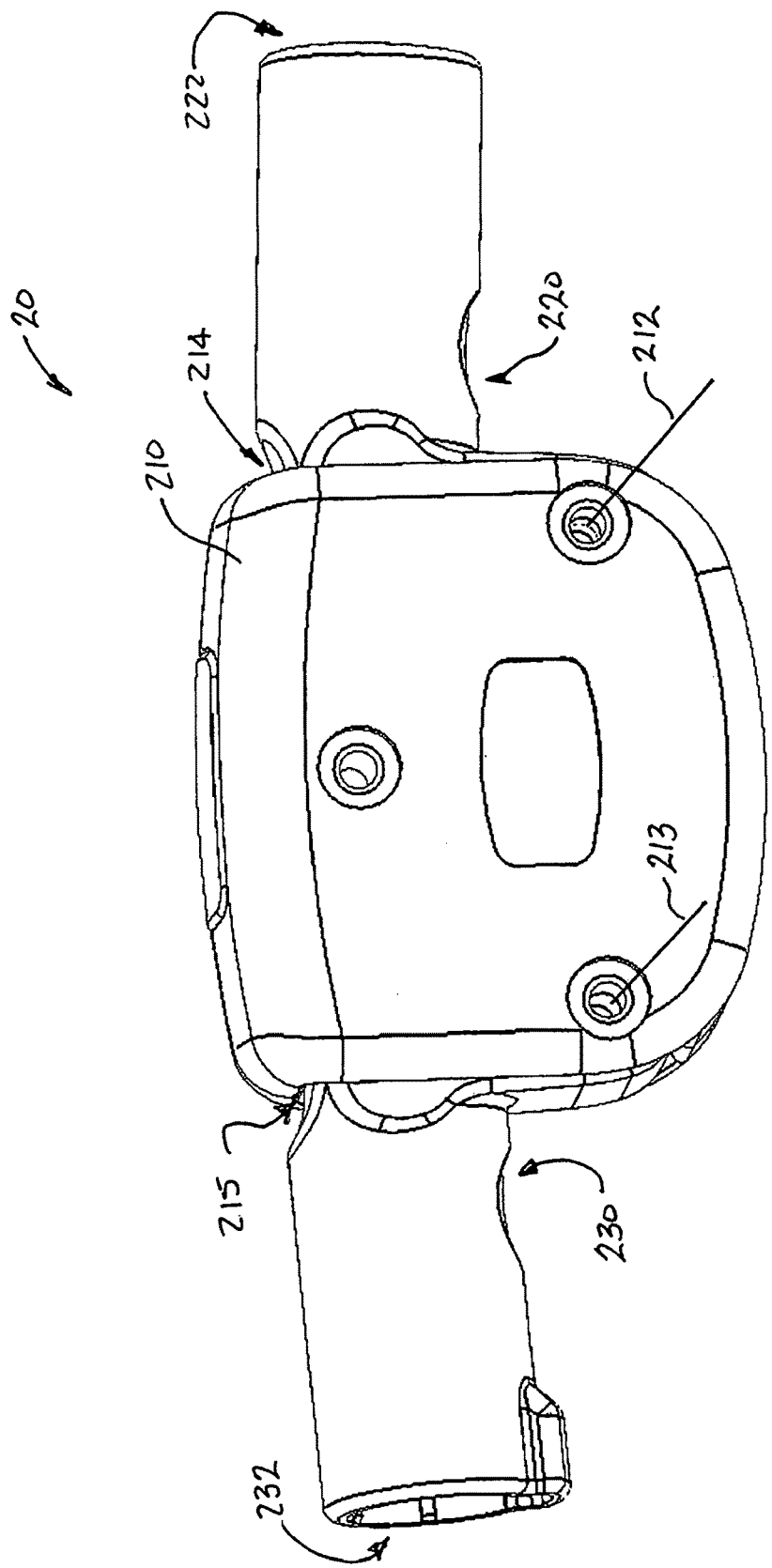
FIG. 3 is a partial view of a folding lock assembly shown in the unfolded orientation.
Figure 4:
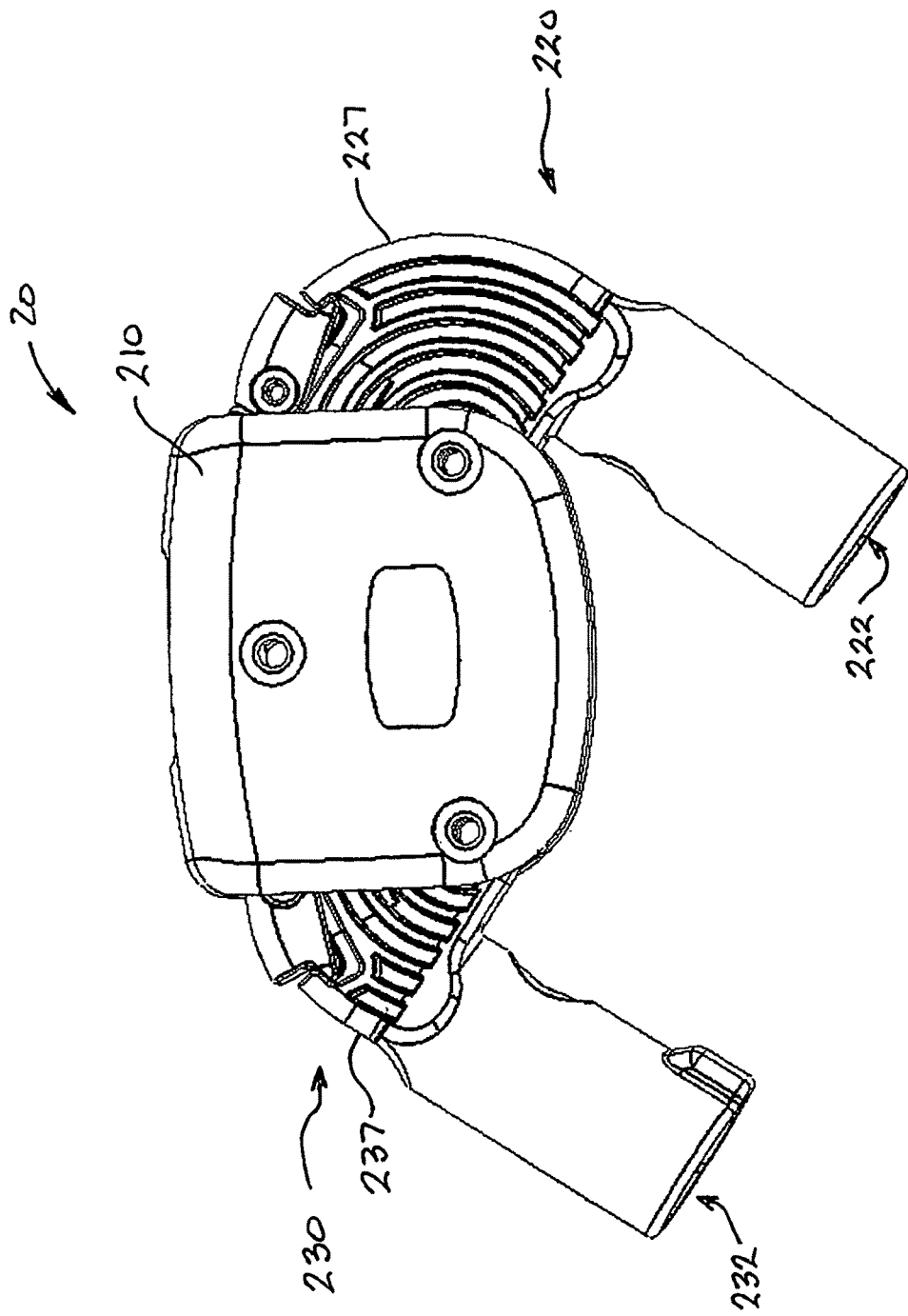
FIG. 4. Is a partial view of the folding lock assembly of FIG. 3 shown in the folded orientation.

Now referring to FIGS. 3 through 4, a folding lock assembly 20 is shown having a body 210 and a pair of frame connectors 220, 230 that hingedly connect to the body 210 for movement about pivots 212, 213. Each frame connector includes a receptacle 222, 232 for receiving a respective end of the first and second side frame portions 12a, 12b (or 14a, 14b) to allow the frame sides to be folded thereby reducing the length of the frame assembly from its unfolded length. The frame connectors 220, 230 are each pivotally moveable between generally opposing deployed (or locked), shown in FIG. 3, and folded, shown in FIG. 4, positions.

Referring now to FIGS. 3 through 10, wherein the internals of the folding lock assembly 20 is shown. Frame connectors 220, 230 are hingedly connected to the body 210 for movement about pivots 212, 213 between generally opposing locked (FIGS. 5 and 8) and folded (FIGS. 7 and 10) positions. Pivoting movement of the frame connectors 220, 230 may be limited by interaction between a limiter structure 229, 239 disposed on each respective frame connector and stop structures within the housing or the interior of the housing itself. When in the deployed position, each limiter 229, 239 contacts a first stop 218, 219 within the body 210; when the frame is folded, the limiters 229, 239 contact a second stop, which in this embodiment is an interior surface of the body 210 adjacent to aperture 214, 215 through which each frame connector 220, 230 partially projects. Each aperture 214, 215 is sized to prevent the respective limiters 229, 239 from passing therethrough. In other embodiments, dedicated stop structures may be provided in the interior of the body.

The first frame connector 220 is configured so that limiter 229 permits connector movement about pivot axis 212 through an angle that is greater than 90 degrees. The second frame connector 230 is configured so that limiter 239 permits connector movement about pivot axis 213 through an angle that is less than 90 degrees. In the embodiment illustrated, the first frame connector pivots approximately 125 degrees between the folded and deployed positions while the second frame connector 230 pivots approximately 55 degrees between the folded and deployed positions. The pivot angles are easily altered to suit specific folding frame designs by varying the configuration of the frame connectors 220, 230 and/or the stops 218, 219. Such alterations result in variations in the offset provided by the lock assembly 20 when folded. Once established, the pivot angle limits are non-adjustable. When each frame connector 220, 230 is moved to the folded position, the body 210 is not perpendicularly aligned with either side frame portion, but is angled. The angling of the body 210, or more specifically the angling of an axis extending between the pivots 212, 213 relative to the side frame portions offsets the distal ends of the side frame portions so that the end frame members 13, 15 are not aligned to contact, even though equal-length side frame portions are used. The result is improved production efficiency by allowing the first and second side frame portions to be identically made while providing a more compact offset folding frame.

The frame connectors 220, 230 each include a radiused surface 227, 237 which is substantially uniformly spaced from the respective pivot axes 212, 213 so that a consistent and minimal space is maintained between the frame connector and the respective adjacent edge of aperture 214, 215 as the frame connectors are rotated between the deployed (locked) position (FIG. 3) and the folded position (FIG. 4). By minimizing the gap between the radiused surface and the aperture 214, 215, the potential for pinching a user's finger between the frame connector and the housing as the frame is repositioned from a folded configuration to a deployed configuration is minimized.

Figure 5:
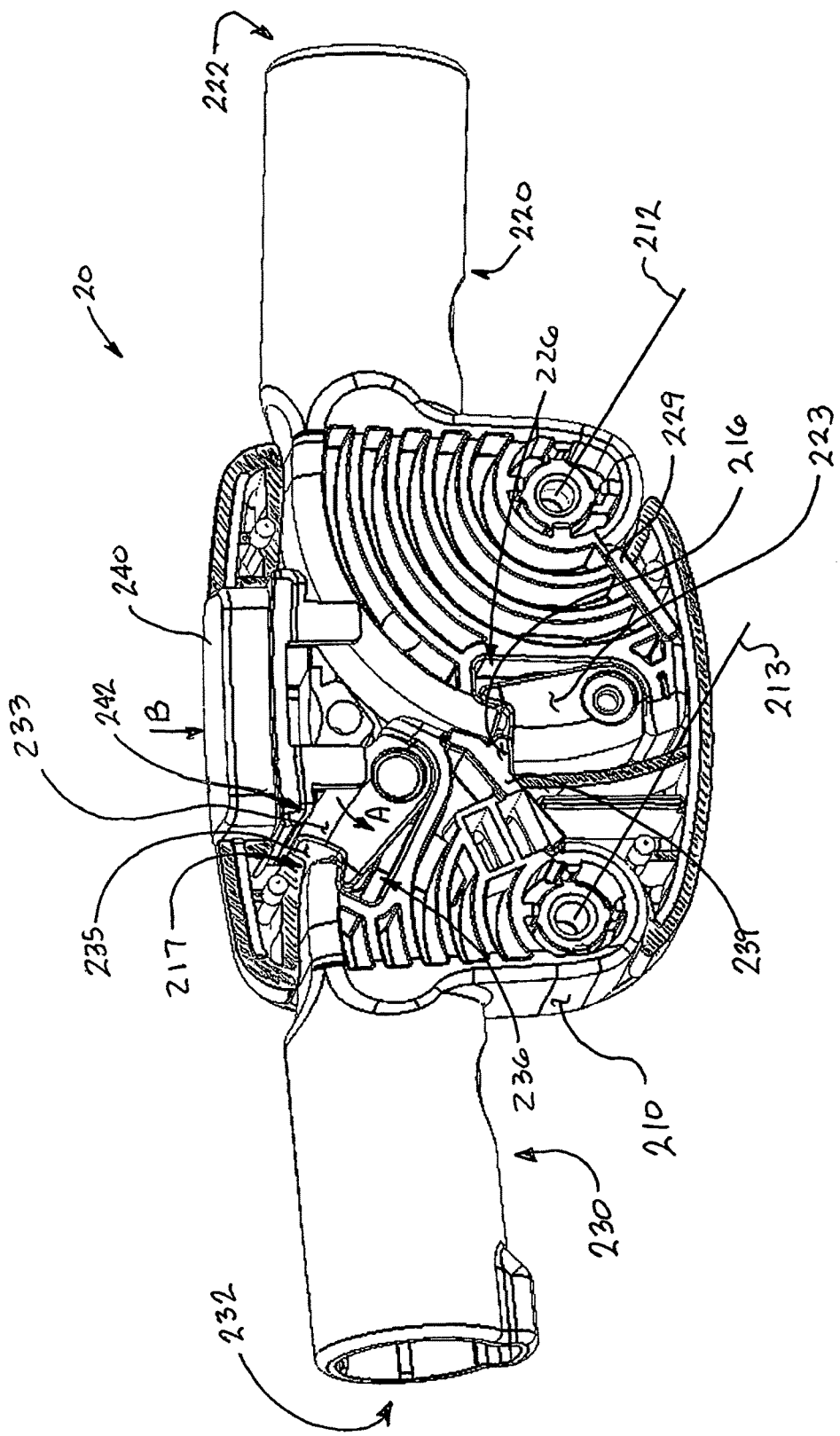
FIG. 5 is a partial view of the folding lock assembly of FIG. 3 shown with a front cover removed wherein the lock assembly is shown in the unfolded and locked orientation.
Figure 6:
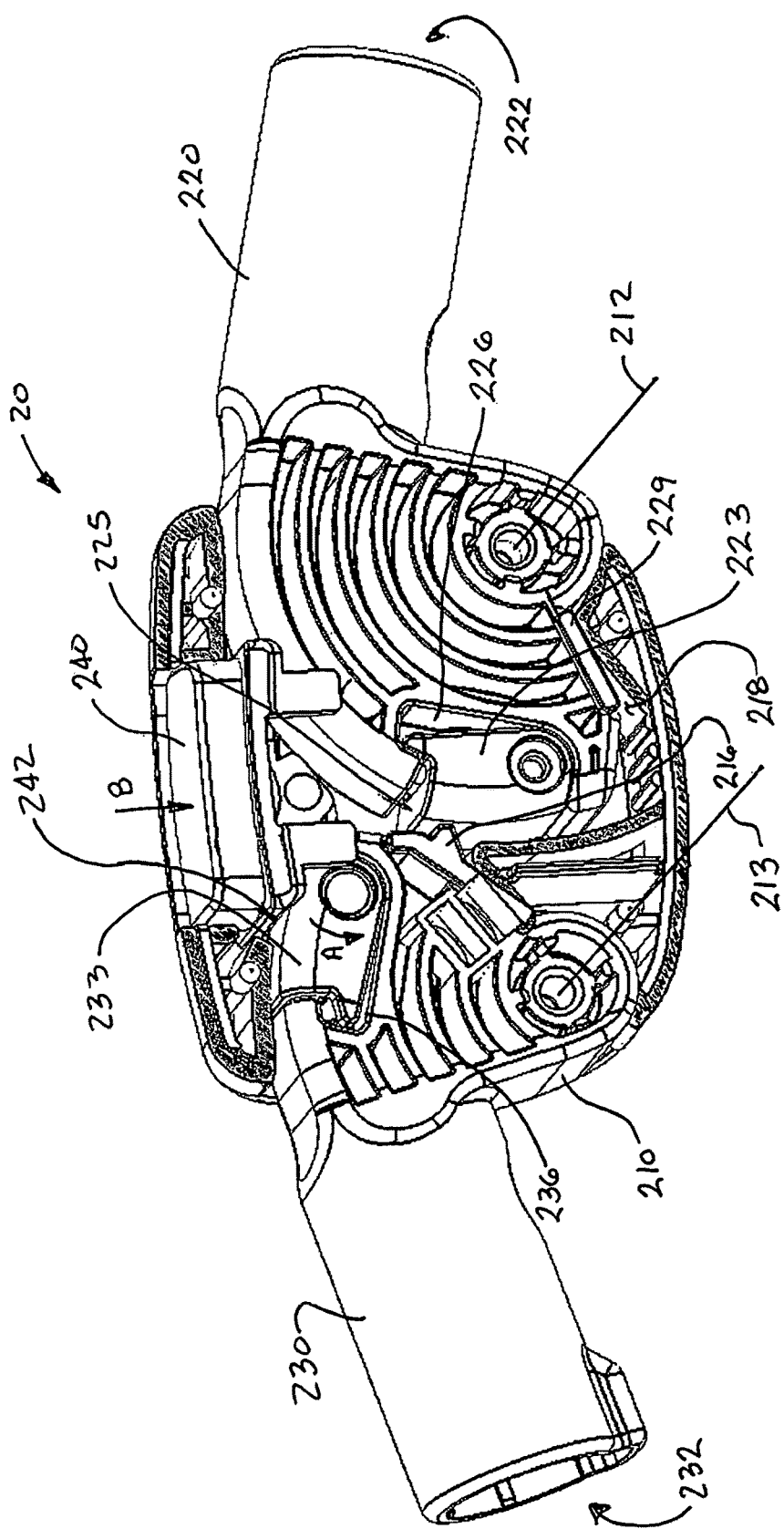
FIG. 6 is a partial interior view of the folding lock assembly of FIG. 3 wherein a releasing mechanism has been operated to permit initial folding movement of the lock assembly.
Figure 7:
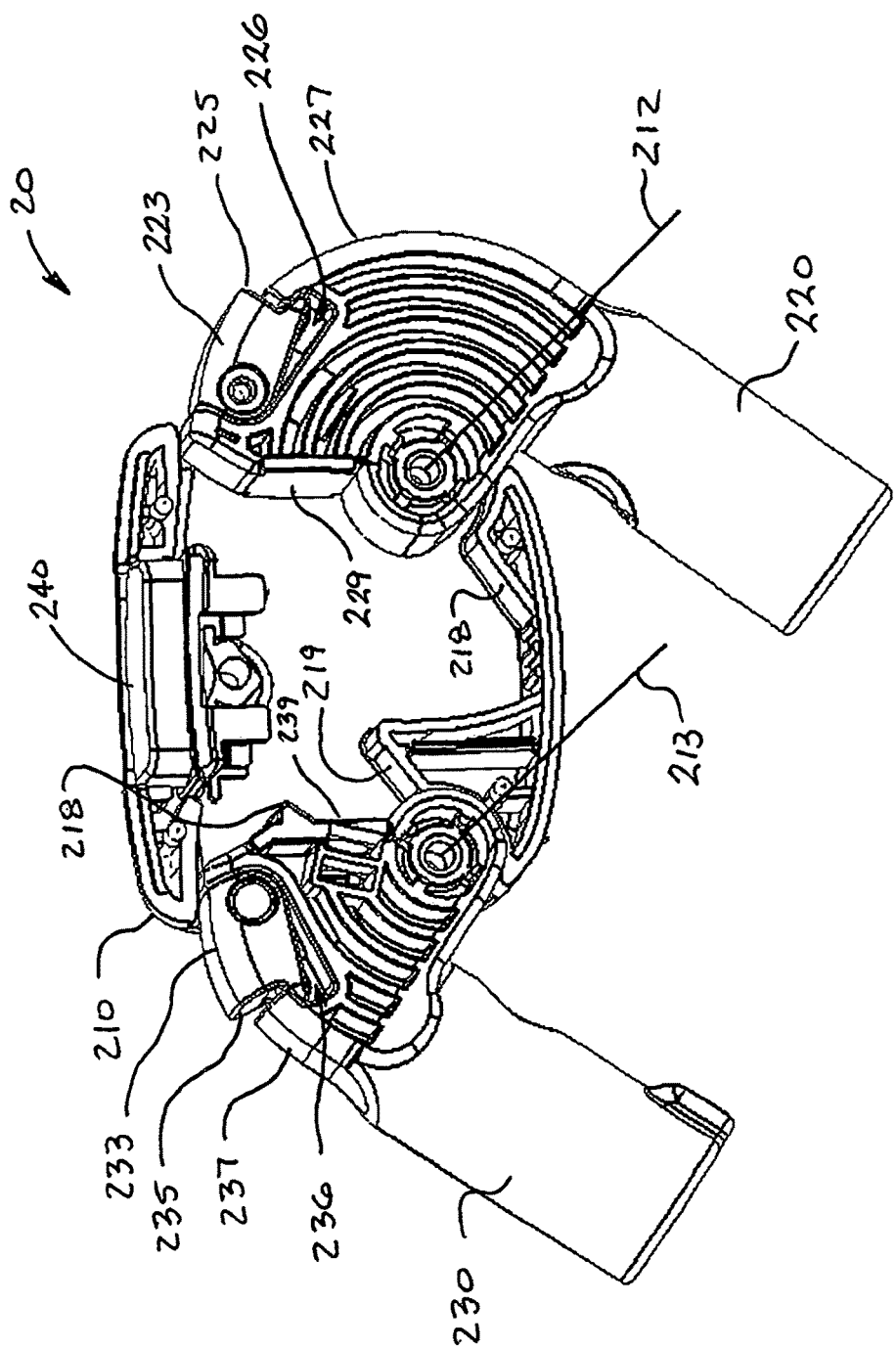
FIG. 7 is a partial interior view of the folding lock assembly of FIG. 3 showing the folding lock assembly in a folded position.
Figure 8:
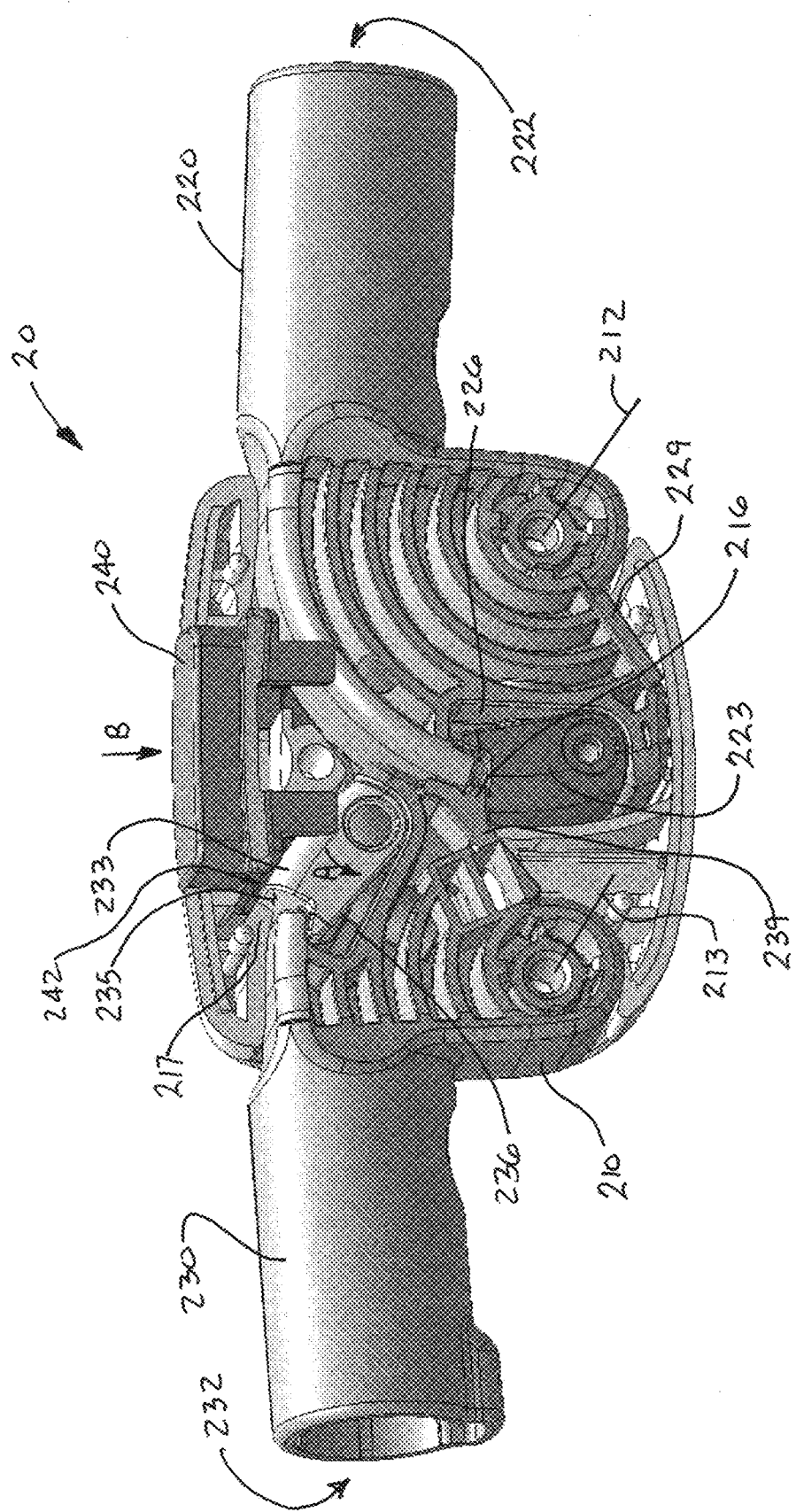
FIG. 8 is an alternate view of the folding lock assembly shown in FIG. 5.
Figure 9:
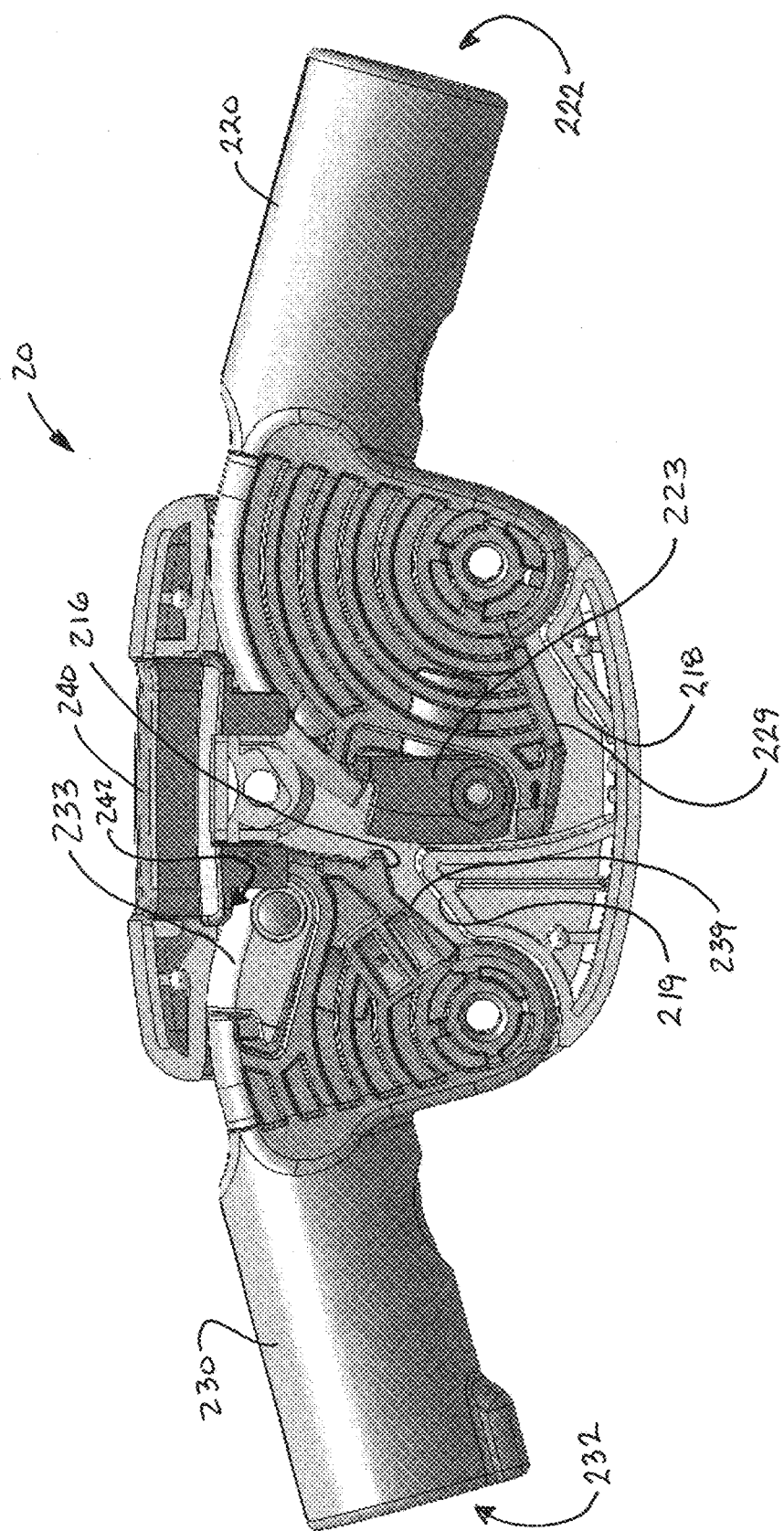
FIG. 9 is an alternate view of the folding lock assembly shown in FIG. 6.
Figure 10:
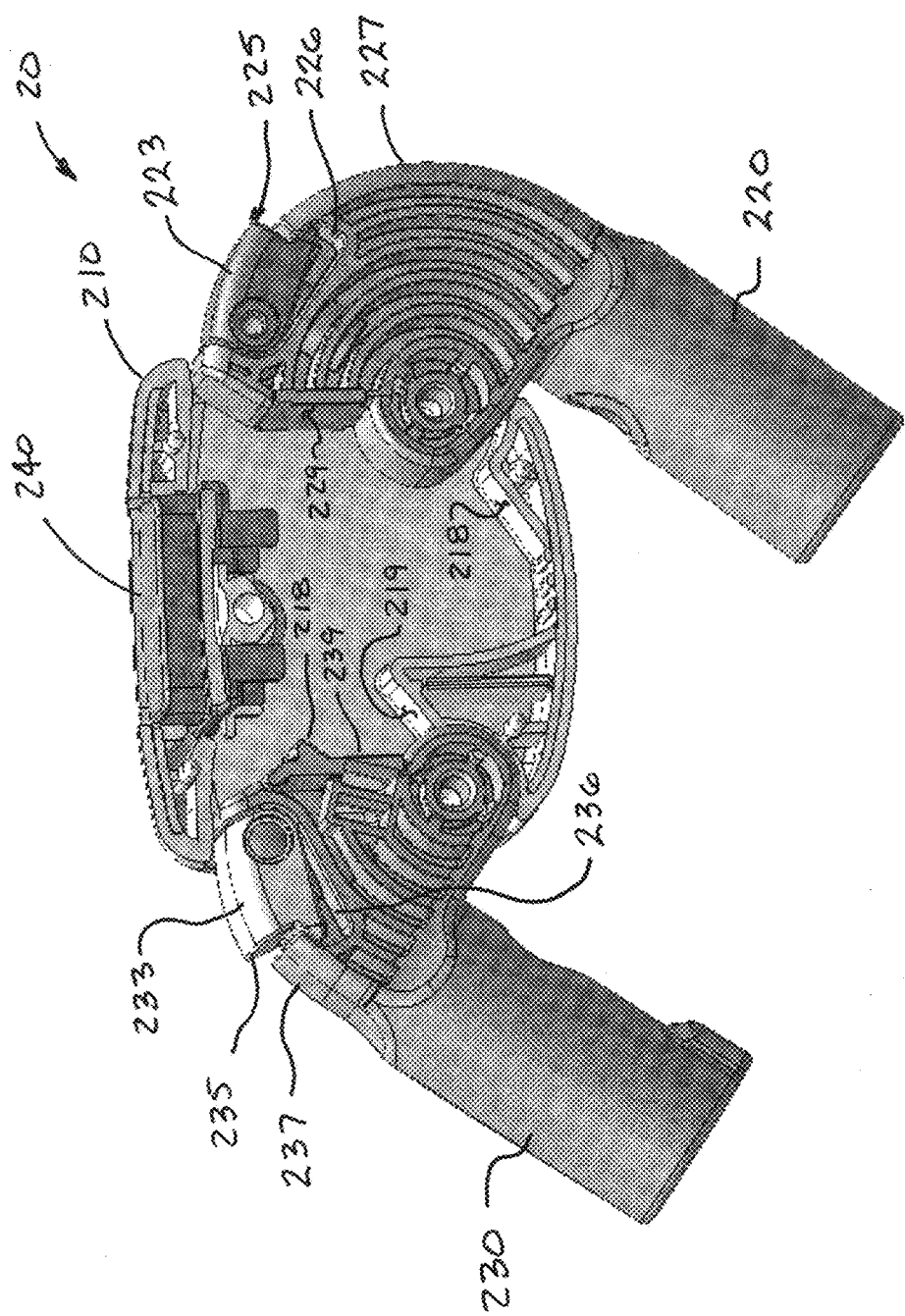
FIG. 10 is an alternate view of the folding lock assembly shown in FIG. 7.

Each frame connector further includes a locking element 223, 233 which is pivotally connected to the respective frame connector and disposed within a respective recess 226, 236 in the frame connector. In the embodiment illustrated, the locking elements are configured as ratchet pawls which allow uninhibited movement in one direction while inhibiting movement in the opposite direction unless disengaged. The locking elements are pivotally connected to respective frame connectors at one end and biased to cause the opposite end to project toward an extended position, as shown in FIG. 5, so that locking element surfaces 225, 235 engage lock stops 216, 217 to inhibit rotation of the respective frame connectors in the folding direction while the locking elements are extended. In the exemplar embodiment, a second lock 217 is disposed on the body 210 interior and positioned to be engaged by the second locking element 233 when the second frame connector 230 is moved to the locked position. A first lock 216 is disposed on the periphery of the second frame connector 230 and positioned to be engaged by the first locking element when the first and second frame connectors 220, 230 are both in the locked position.

The second locking element 233 may be released by interaction with a release button 240 which, when depressed (direction arrow "B" shown in FIGS. 5 and 6), drives contacting end 242 downwardly (indicated by arrow "A", FIGS. 5 and 6) to contact and pivot the second locking element 233 into its lock recess 236 so that the second lock surface 235 no longer interacts with the lock stop 217. This permits the second frame connector 230 to pivot away from the locked position. Movement of the second frame connector 230 also displaces the first lock stop 216 against which the first lock surface 225 is abutted while the second connector is in the locked position thereby allowing the frame first connector 220 to also pivot away from the locked position. The locking elements 223, 233 are biased outwardly in relation to their respective radiused surfaces 227, 237 so that each normally engages respective lock stops 216, 217 when so positioned. The pivot location of the locking elements 223, 233 allows the frame connectors to be rotated from the folded position toward the locked position without inhibition by the locking elements, but requires that the first locking element 233 to be released or disengaged before the frame can be moved from the locked position toward the folded position.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A folding lock assembly for a child's play yard frame comprising:
   a lock support structure;
   a first rail connector pivotally coupled to the lock support structure for movement about a first pivot axis between generally opposing unfolded and folded positions, the lock support structure being configured to limit pivotal movement of the first rail connector to a first angular displacement;
   a second rail connector pivotally coupled to the lock support structure for movement about a second pivot axis parallel to and spaced apart from the first pivot axis between generally opposing unfolded and folded positions, the lock support structure being configured to limit pivotal movement of the second rail connector to a second angular displacement;
   a first locking element disposed on the first rail connector and moveable between locked and released positions, the first locking element when in the locked position engaging the lock support structure when the first rail connector is in the unfolded position to inhibit rail connector movement toward the folded position;
   a second locking element disposed on the second rail connector and moveable between locked and released positions, the second locking element when in the locked position engaging a block structure on the first rail connector when the first and second rail connectors are in the unfolded positions to inhibit second rail connector movement toward the folded position; and
   a release actuator configured to move the first locking element toward the released position;
   the lock housing partially surrounding the first and second rail connectors, the housing having first and second apertures through which the first and second rail connectors partially extend, the rail connectors each having a radiused surface uniformly spaced apart from the respective pivot axes and disposed adjacent to respective edge portions of the respective apertures, the radiused surfaces configured to maintain a substantially uniform separation from the respective edge portions as the rail connectors are pivoted between the unfolded and folded positions wherein the first angular displacement is less than ninety degrees and the second angular displacement is greater than ninety degrees.

2. The lock assembly of claim 1, wherein each locking element includes a pawl pivotally connected to the respective rail connector and each radiused surface includes a recess for receiving the respective pawl when in the released position, each pawl extending outwardly beyond the radiused surface when in the locked position.

3. The lock assembly of claim 2, wherein the lock support structure includes at least one stop block for engaging the pawl of the first locking element when extended outwardly in the locked position, interaction between the pawl and the stop block retaining the first rail connector in the deployed position.

4. The lock assembly of claim 3, wherein the first rail connector includes at least one stop block configured to engage the pawl of the second locking element when extended outwardly in the locked position, interaction between the pawl and the stop block retaining the first rail connectors in the deployed position.

5. The lock assembly of claim 1, wherein the first angular displacement is approximately fifty-five degrees and the second angular displacement is approximately one hundred twenty-five degrees.

6. A folding lock assembly for a child's play yard frame comprising:
   a first rail connector pivotally coupled to a lock housing for pivoting movement between generally opposing folded and unfolded positions, movement therebetween limited to a first angular displacement;
   a second rail connector pivotally coupled to the lock housing for pivoting movement between generally opposing folded and unfolded positions, movement therebetween limited to a second angular displacement, the lock housing partially surrounding the first and second rail connectors and having first and second apertures through which the first and second rail connectors partially extend, the rail connectors each having a radiused surface uniformly spaced apart from each rail connectors respective pivot axis and disposed adjacent to respective edge portions of the respective apertures, the radiused surfaces configured to maintain a substantially uniform separation from the adjacent edge portions as the rail connectors are pivoted between the unfolded and folded positions;

first and second locking elements disposed on the first and second rail connectors, respectively, the locking elements moveable between locked and released positions, when in the locked position the first locking element engaging the lock housing when the first rail connector is in the unfolded position to inhibit rail connector movement away from the unfolded position, movement of the second rail connector away from the unfolded position being inhibited by interaction between the second locking element and the first rail connector when the first rail connector is in the unfolded position; and a release actuator configured to permit selective movement of the first locking element toward the released position thereby enabling the first and second rail connectors to move from the unfolded position.

7. The lock assembly of claim 6, wherein each locking element is configured as a pawl pivotally connected to the respective rail connector and each radiused surface includes a recess for receiving the respective pawl when in the released position, the pawl extending outwardly beyond the radiused surface when in the locked position.

8. The lock assembly of claim 7, wherein the first angular displacement is less than ninety degrees and the second angular displacement is greater than ninety degrees.

* * * * *